Figure 1:
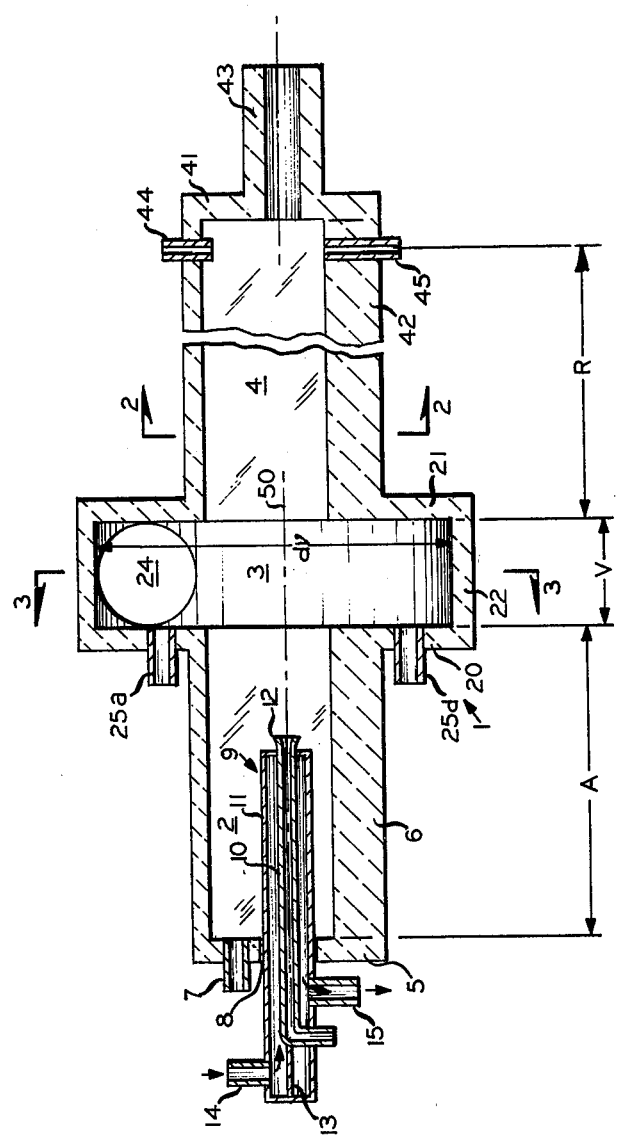

United States Patent [19]

Vanderveen

[11] 4,094,960

[45] June 13, 1978

[54] PROCESS FOR PRODUCTION OF CARBON BLACK

[75] Inventor: John W. Vanderveen, Bartlesville, Okla.

[73] Assignee: Phillips Petroleum Company, Bartlesville, Okla.

[21] Appl. No.: 663,891

[22] Filed: Mar. 4, 1976

[51] Int. Cl.$^2$ .......................... C01B 31/02; C09C 1/48
[52] U.S. Cl. .................................... 423/456; 423/450; 23/259.5
[58] Field of Search ............... 423/450, 455, 456, 457; 23/259.5

[56] References Cited

U.S. PATENT DOCUMENTS

| | | |
|---|---|---|
| 3,460,911 | 8/1969 | Krejci et al. .......................... 23/259.5 |
| 3,607,057 | 9/1971 | Henderson et al. .................. 423/455 |
| 3,619,138 | 11/1971 | Gunnell ................................ 423/455 |
| 3,753,658 | 8/1973 | Henderson et al. .............. 423/450 X |
| 3,984,528 | 10/1976 | Cheng et al. ......................... 423/456 |

*Primary Examiner*—O. R. Vertiz
*Assistant Examiner*—Gregory A. Heller

[57] ABSTRACT

A carbon black reactor with axial hydrocarbon feed and having an axial zone with triangular cross-section, a wider vortex section for generation of a combustion gas vortex, a reaction section and having essentially tubular shape is useful for the production of high tint and high structure carbon black. In a process for the production of carbon black, hydrocarbon feed is axially introduced into the reactor and contacted with a vortex of hot combustion gases.

5 Claims, 4 Drawing Figures

PROCESS FOR PRODUCTION OF CARBON BLACK

The present invention relates to the production of carbon black. In one of its more specific aspects, the present invention relates to a reactor for the production of carbon black. In another aspect, the present invention relates to a process for the production of a carbon black. More specifically, the present invention relates to a process and apparatus for the production of high tint and high structure carbon black.

BACKGROUND OF THE INVENTION

Carbon black has been produced for many years by pyrolytical decomposition of hydrocarbon feedstocks, e.g., aromatic oils. One very successful known process for the production of carbon black consists in contacting normally liquid hydrocarbon feedstock with hot combustion gases produced by combusting a fuel, e.g., natural gas.

The properties of carbon black can be varied in broad ranges by adjusting several parameters of the furnace process and the reactor. Some properties of carbon black seem to be correlated so that they cannot be independently varied in a given reactor by merely adjusting adjustable parameters.

Two properties of carbon black that are inversely related seem to be tint and structure. Tint or tinting strength is a measure for the coloring power of a carbon black as compared to a standard carbon black. Different methods to determine tint experimentally have been described in the art. Today tint is determined in accordance with ASTM D 3265-73. Structure is a measure for the complexity of the carbon black particle. The more carbon black nodules are "fused" together into the carbon black aggregates, the higher the structure of such a carbon black is. The structure is determined in accordance with the ASTM method D-2414-70.

It has been found that an increase in tint lowers the structure of the respective carbon black and vice versa. This is particularly the case in tubular carbon black reactors in which a hydrocarbon feed stream is axially fed along the reactor axis and is mixed with a vortex of hot combustion gases, which is generated around the axial feed stream such as to decompose the hydrocarbon feed stream into carbon black.

It would be desirable to have a carbon black reactor available that is basically such a tubular reactor with a hot combustion gas vortex surrounding the hydrocarbon feed stream, but that is versatile enough to allow the production of carbon black with high structure and high tint.

THE INVENTION

It is one object of this invention to provide a new carbon black reactor.

Another object of this invention is the provision of a process to produce carbon black.

A further object of this invention is to provide a carbon black reactor in which a furnace carbon black process can be carried out to produce a carbon black having both high tint and high structure.

Still a further object of this invention is to provide a carbon black reactor that is highly versatile and that can be utilized for the production of various carbon blacks with different properties without the necessity to cool the reactor down and open it up between runs in order to change out or modify portions of the reactor for the production of different carbon blacks.

Figure 3:
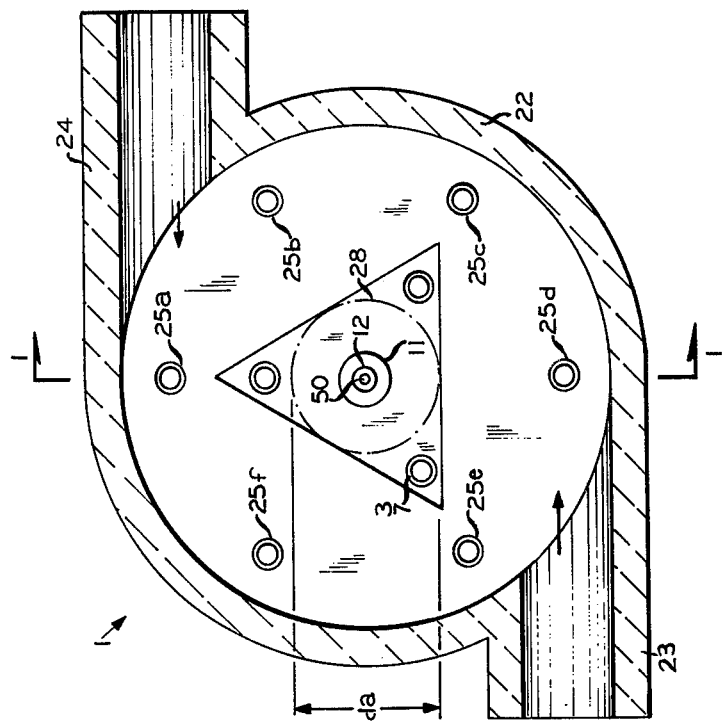
Figure 2:
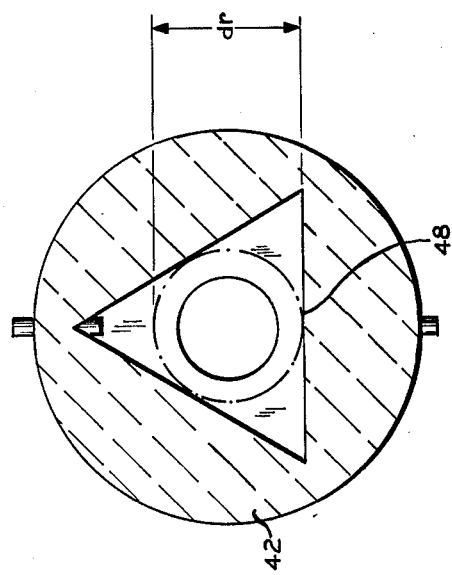
Figure 4:
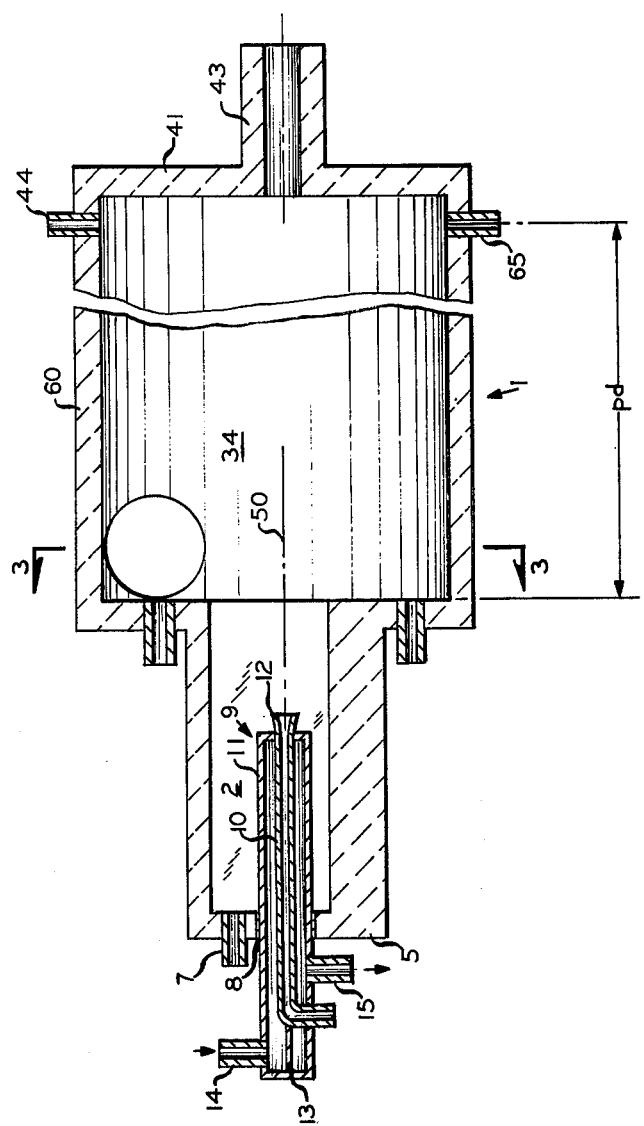

Further objects, details, features, advantages and embodiments of this invention will become apparent to those skilled in the art from the following description of the invention, the appended claims and the drawing in which FIG. 1 is a longitudinal cross-section through a carbon black reactor in accordance with this invention, FIG. 2 is a cross-section taken along lines 2—2 of the reactor shown in FIG. 1, FIG. 3 is a cross-section through the reactor taken along lines 3—3 of the reactor shown in FIG. 1, FIG. 4 is a longitudinal cross-section through another embodiment of this invention.

In accordance with this invention, I have now found that in a carbon black reactor comprising an axial zone in open communication therewith a wider vortex zone and in open communication therewith a reaction zone, a wide variety of carbon blacks and particularly carbon blacks having both high structure and high tint can be produced if the axial zone has essentially triangular cross-section.

More particularly, the longitudinally disposed carbon black reactor of this invention comprises an upstream confining wall, a downstream confining wall, and a tubular confining wall between the upstream and the downstream confining walls; this tubular confining wall in turn comprises an axial section which is connected to the upstream confining wall and which axial section has essentially triangular cross-section and confines an axial zone; in open communication and axial alignment with and operatively connected to this axial section, the tubular confining wall of the reactor comprises a vortex section which is wider than the axial section; this vortex section has an essentially plane upstream wall via which it is connected to the axial section and connected to this essentially plane upstream wall comprises a cylindrical wall confining a vortex zone; in open connection and axial alignment and operatively connected to said vortex section the tubular confining wall comprises a reaction section confining a reaction zone; the reaction section in turn is connected to said downstream confining wall. The words "reaction section" are not intended to indicate that the entire carbon black forming reaction or the major portion thereof takes place in this section; it is presently believed that certain properties of the carbon black are influenced by this section. By way of first conduit means which are attached to the reactor, hydrocarbon feedstock can be introduced into the reactor along the reactor axis. These first conduit means comprise a hydrocarbon feed discharge nozzle, which is located within the axial zone. The reactor of this invention furthermore comprises vortex generating means that are attached to the reactor for generating a vortex of hot combustion gases in the vortex zone close to the cylindrical wall and close to the plane upstream wall. The vortex can be generated by tangential introduction of hot combustion gases or by tangential introduction of air into admixture with and combustion of fuel which in turn can be introduced tangentially or axially into the vortex section. From the downstream end of the reactor, carbon black-containing smoke can be withdrawn by way of second conduit means that are attached to the downstream confining wall.

The upstream confining wall of the reactor is usually plane. However, this wall can have other shapes. The upstream confining wall is sufficiently far upstream from the feed discharge nozzle and the vortex zone that this wall does not influence the flow of reactants in any significant degree. The first conduit means for the introduction of hydrocarbon feed into the axial zone generally extend through the upstream confining wall. Preferably these first conduit means are arranged slideably in this upstream confining wall so that the axial position of the hydrocarbon feed discharge nozzle can be adjusted.

The hydrocarbon feed conduit is surrounded by a cooling jacket which can be a surrounding air tube injecting the cooling jacket air around the nozzle into the reactor in axial direction. The cooling jacket, however, can also be an indirect cooling means such as a closed pipe surrounding the hydrocarbon feed conduit and having means for the circulation of water through this pipe and around the hydrocarbon feed conduit associated therewith.

The axial section of the tubular confining wall of this reactor is designed such that at least the downstream portion thereof has essentially triangular cross-section. It is, however, possible to use a reactor having an axial zone which in the entire tubular length of this zone has triangular cross-section. However, it is presently believed that it is sufficient for the purpose of this invention to have the triangular cross-section of the axial zone at least from the location of the hydrocarbon feed discharge nozzle all the way to the downstream end of the axial zone.

The position of the hydrocarbon feed discharge nozzle within the axial zone can be readily determined and is selected to produce the carbon black with the desired properties. Generally the location of the hydrocarbon discharge nozzle in the axial zone will be 0.1 to 4, preferably 0.2 to 2, diameters of the circle inscribed into the triangle cross-section of the axial zone upstream of the downstream end of the axial zone.

The longitudinal axial zone in accordance with this invention has essentially triangular cross-section. The word cross-section, therefore, refers to the hollow inside area surrounded by the axial section of the tubular confining wall of the reactor. The outside shape of this tubular confining wall can be different in cross-section from a triangle and can be, for instance, cylindrical.

Whereas the shape of the cross-section of the downstream portion of the axial zone can be varied, the individual sides of the triangle are generally not smaller than 1.3 $da$ and not larger than 3.2 $da$. Preferably the sides are larger than about 1.5 $da$ and smaller than about 2 $da$. In this definition, $da$ is the diameter of the circle inscribed into the triangle and touching each of the three sides. Preferably the cross-section of the downstream portion of the axial zone is an equilateral triangle, wherein $L = \sqrt{3} \cdot da$.

In accordance with a preferred embodiment of this invention, there are provided conduit means for the introduction of reactants selected from the group consisting of oxidant gas and gaseous fuel into the axial zone upstream of the hydrocarbon feed discharge nozzle. These conduit means generally extend through the upstream confining wall and the discharge ends face in axial direction. Oxidant gas refers to oxygen or an inert gas containing oxygen, such as air or oxygen-enriched air.

The axial section is operatively connected at its downstream end which has triangular cross-section to a vortex section of the tubular confining wall. This vortex section comprises a plane upstream wall through which the axial zone opens into the vortex zone and, connected to the plane upstream wall, a cylindrical wall which surrounds the vortex zone. The cylindrical wall and the vortex zone have essentially circular cross-section. Again the outside shape of this portion of the tubular confining wall is of no importance. The outside shape can be cylindrical as well or it can have another shape.

The reactor of this invention is provided with conduit means to generate a vortex of hot combustion gases close to the plane upstream wall of the vortex section and also close to the cylindrical wall of the vortex section. The vortex created has the same axis as the longitudinal reactor.

In accordance with a first embodiment, the vortex of hot combustion gases can be generated by tangential inlets opening into the vortex zone through the cylindrical wall connected to tangential conduits. These conduits in turn are connected to a source of hot combustion gases. Generally, the tangential conduits define a cylindrical air channel in the center of which a fuel oil or fuel gas nozzle is arranged. The combustion of fuel produces the hot combustion gases which are then tangentially introduced into the vortex section to generate a vortex of hot combustion gases.

In accordance with another embodiment, there are provided tangential oxidant, such as air or oxygen-enriched air, inlet conduits opening tangentially into the vortex zone through the cylindrical wall for the injection of oxidant only. The fuel necessary for the production of the hot combustion gasses is axially introduced through conduits that open in axial direction through the plane upstream wall of the vortex section. The fuel mixes with the vortex and the combustion of the gas produces a vortex of hot combustion gases.

Without any limitation of the invention to the following explanation, it is presently believed that the axial zone with the triangular cross-section, at least at the downstream end thereof, converts the hot combustion gas vortex into a layer of highly turbulent gas flow. This layer extends backward into the axial zone. The hydrocarbon feed is sprayed directly into the highly turbulent and very hot gas, which results in a carbon black with high tint and high structure properties.

The specific dimensions of the reactor are not very critical. Generally the axial zone and the vortex zone will have dimensions defined by the following ranges for the ratios:

$da/A$ about 0.1:1 to 1:1
$dv/V$ about 1:1 to 4:1
$dv/da$ about 2:1 to 10:1

In these ratios $da$ is the diameter of the circle inscribed into the triangle cross-section of the axial zone, A is the axial length of the axial zone, $dv$ is the diameter of the vortex zone, V is the axial length of the vortex zone.

The absolute size of the reactor is not critical. Usually the dimensions will be in the following ranges:

$dv$ about 14 to 70 inches
$da$ about 7 to 35 inches

Downstream of the vortex section, the carbon black reactor of this invention is provided with a reaction section that can have any cross-sectional shape that allows the pyrolytic decomposition reaction to be completed and a carbon black-containing smoke to be withdrawn.

Thus in accordance with one embodiment of this invention, the essentially cylindrical wall of the vortex section is connected to a reaction section having the same internal diameter which can cover the entire length of the downstream section of the carbon black reactor. The downstream end of the reaction section is closed by the downstream confining wall equipped reactor. No physical partition exists in this embodiment between the vortex section and the reaction section. This embodiment is called the axial A-type carbon black reactor. Since the reaction section of the tubular confining wall has essentially the same diameter as the cylindrical wall of the vortex section, the two portions can be made from one piece without any physical boundary between them. The diameter of the essentially cylindrical wall of the vortex section and of the reaction section can vary in broad ranges. Generally this diameter $dv$ will be related to the distance $pd$ between the plane upstream wall and a final quench location, as well as to the diameter $da$ of a circle inscribed into the triangle cross-section of the axial section by the following relationships:

$dv/pd$ about 1:50 to 1:3
$dv/da$ about 2:1 to 10:1

In another embodiment, called the axial O-type carbon black reactor, the vortex zone is operatively connected in open communication and axial alignment with a reaction zone of smaller cross-section than the vortex section. The cylindrical wall of the vortex section is connected to a downstream wall, preferably a plane downstream wall. This downstream wall in turn opens into the aligned reaction section. The cross-section of this reaction section can be of any desired shape, e.g., circular or triangular. A choke can be provided for that generates either a constant diameter or a venturi shaped constriction which both can have circular or triangular cross-section.

The diameter $dv$ of the vortex zone (combustion zone) of such an O-type reactor is related to the axial length R of the reaction section, which is the distance between the downstream wall and the final quench, as well as to the diameter of the reaction section $dr$ which in case of a triangular cross-section of the reaction section is the diameter of the inscribed circle as follows:

$dr/R$ about 1:40 to 1:2
$dv/dr$ about 3:1 to 10:1.

To generate a backflow of hot combustion gases into the axial zone, it is presently preferred that the diameter of the reaction zone is smaller than that of the axial zone. This can be expressed by the relation $(dr/da) \leq 1$.

At the downstream end of the reactor and usually close to the downstream confining wall, the carbon black reactor is provided with quench means for the introduction of a quenching fluid, e.g., water or smoke to quench the hot carbon black-containing smoke. This quench serves to adjust the photelometer of the carbon black.

The carbon black reactor is lined with refractory material, e.g., ceramic material. Nozzles and other parts exposed to high temperatures within the reactor can be made from heat-resistant metals such as tungsten or high temperature-resistant steel.

The present invention also relates to a process for the production of carbon black. In accordance with this invention, normally liquid hydrocarbon feed is introduced essentially in axial direction and along the axis of the reactor described above into the downstream portion of the axial zone; a vortex of hot combustion gases, either oxidizing, reducing, or stoichiometric, is generated in the vortex zone close to the plane upstream wall thereof; these hot combustion gases and the hydrocarbon feed are mixed; the hydrocarbon feed is pyrolytically decomposed to carbon black; a carbon black-containing smoke is produced; this smoke is quenched and is recovered and the carbon black is separated therefrom. The hydrocarbon feed can be entered into the reactor in gaseous or liquid phase. The feed can be liquid or gaseous under normal temperature and pressure conditions. The nature of hydrocarbon feed depends upon the properties of carbon black desired. Highly aromatic oils tend to produce carbon black with high structure.

Typical highly aromatic oils useful for the purposes of this invention are those with a BMCI of 80 to 160 and a mid boiling point of 200° to 600° F. The fuel can be a normally gaseous or liquid fuel. Typical examples for gaseous or liquid hydrocarbon fuels are methane, natural gas, propane, heating oils, kerosene, naphtha, and heating distillates. The same hydrocarbon can be used as fuel and as feedstock.

In order to produce a carbon black with high tint, either no additional gas or a gas essentially free of free oxygen is introduced into the axial zone. To produce a carbon black with low tint, a free oxygen-containing gas is introduced into the axial zone. This free oxygen-containing gas preferably is from the group consisting of oxygen, oxygen-enriched air and air.

The quantities of reagents employed in the process and reactor of this invention can be varied in broad ranges. Generally, however, the reactants will be within the following ranges:

Hot combustion gas vortex:

Generally the ratio of oxidant to fuel is such that it is between 0.8 and 2.5 times the stoichiometric ratio, which is that ratio at which the fuel is fully combusted in the oxidant and there is neither free oxygen nor fuel left after combustion.

The volume ratio of oxidant to fuel, calculated as air to natural gas ($CH_4$), will be in the range of about 8:1 to about 25:1. The range of this volume ratio is changed, of course, if instead of air another oxidant such as pure oxygen is used. Similarly, the ratio is changed if instead of natural gas another gaseous fuel is used. Thus, for instance, in case propane is used as the fuel gas, the volume ratio of oxidant to propane calculated as air to propane, both under standard conditions, will be in the range of about 20:1 to about 60:1.

Oxidant and hydrocarbon feed:

The ratio of total oxidant to hydrocarbon feed calculated as total air (SCF) to hydrocarbon feed (gallons) will generally be in the range of about 300:1 to 1500:1 (SCF/gal). Again, these figures will be different if instead of air another oxidant gas such as oxygen is being used.

Axial oxidant and axial fuel:

The axial oxidant introduced is related to the feed of hydrocarbon as follows: Generally the ratio of axial oxidant calculated as SCF of oxygen to hydrocarbon feed in gallons will be in the range of 0 to about 100 (SCF/gal).

In case there is axial fuel gas being introduced, the gas volume ratio of natural gas to the hydrocarbon feed will be in the range of 0 to about 250 (SCF natural gas/gal. liquid feed).

In the case of propane, this gas volume ratio will be in the range of 0 to about 100 (SCF propane gas/gal. liquid hydrocarbon feed).

The temperature and pressure conditions in the reactor generally will be as follows:

|  | Temperature | Pressure |
|---|---|---|
| Axial zone | 2800–3400° F | 2 psig – 15 psig |
| Vortex zone | 2900–3100° F | 2 psig – 15 psig |
| Reaction zone | 2500–3000° F | 2 psig – 15 psig |

The absolute quantity of hydrocarbon fed into the reactor largely is dependent upon the size of the reactor used.

In case of an A-type reactor, the feed F in gallons per hour is related to the diameter of the vortex zone dv in inches by the following relationship:

about $0.4 \leq F/dv^2 \leq 0.7$ (gal/hr in$^2$).

In case of an O-type reactor, the respective generally employed limitation for the feed stream relating to the diameter of the reaction section dr is given by the following relationship:

about $1.0 \leq F/dr^2 \leq$ about 3.5 (gal/hr in$^2$).

The invention will still be more fully understood from the following description of the drawings and the examples.

FIGS. 1, 2 and 3 of the drawings show cross-sections through a carbon black reactor in accordance with this invention. The carbon black reactor is confined by a tubular confining wall 1 made from refractory material such as ceramic material which in turn can be encased in steel jacket (not shown). The reactor essentially consists of a tubular confining wall 1 of three sections, namely an axial section confining an axial zone 2, a vortex section confining a vortex zone 3, and a reaction section confining a reaction zone 4.

The axial zone 2 is confined by an upstream wall 5 and an axial section 6 defining the tubular-shaped axial zone 2 having a triangular cross-section as can be seen in FIG. 3. A conduit 7 is attached to the upstream wall 5 so that reactants can be introduced into the axial zone in axial direction therethrough. Furthermore, the upstream wall 5 is provided with a bushing 8. In this bushing 8 the hydrocarbon feed system 9 can be moved to the desired axial location. The hydrocarbon feed system 9 consists essentially of a central feed pipe 10 and a surrounding cooling pipe 11. The feed pipe 10 ends in a hydrocarbon discharge nozzle 12. The cooling pipe 11 is divided by a wall 13 into an upper and a lower section so that a cooling means, e.g., water, can be introduced via inlet 14 and withdrawn via outlet 15 with coolant circulating all the way to the downstream end of the pipe 11 such as to cool the nozzle 12.

The vortex zone 3 is an essentially cylindrically shaped zone with the cylindrical axis coextensive with the reactor axis. This reactor axis is also coextensive with the axial zone 2 and the reaction zone 4 and this axis passes through the center of both triangular cross-sections of the zones 2 and 4. The vortex zone 3 is confined by an upstream confining wall 20 and a downstream confining wall 21 which is parallel to the upstream confining wall 20. The two plane walls 20 and 21 are connected to each other by a cylindrical wall 22. The cylindrical wall 22 in turn is connected with two tangential inlet pipes 23 and 24 for the introduction of oxidant gas into the vortex zone 3. The two tangential inlet pipes 23 and 24 are arranged as such to generate the same rotational sense of oxidant gas being introduced therethrough into the vortex zone 3. Six pipes 25a, b, c, d, e, and f are arranged symmetrically to and with the same distance from the reactor axis 50. These pipe 25a–f serve to introduce gaseous fuel in axial direction into the vortex zone.

The reaction zone 4 is confined by a downstream confining wall 41 and a reaction section 42 of the tubular confining wall 1. The reaction section defines the triangular cross-section of the reaction zone 4. Attached to the downstream confining wall 41 is a carbon black smoke withdrawal pipe 43. Close to the downstream end of the reaction zone, quench means such as water injecting pipes 44 and 45 are provided for. These quench means serve to stop the pyrolytic decomposition process and to reduce the temperature of the carbon black-containing gas. If desired, the reaction zone 4 can be provided with a choke in order to generate high turbulence of the reaction mixture.

In FIGS. 2 and 3, circles 28 and 48 are shown in dash-dotted lines. These circles 28 and 48 are imaginary circles, the diameters of which define the size of the equilateral triangular cross-section of axial zone 2 and reaction zone 4, respectively. The circles touch all three sides of the respective triangles.

The carbon black reactor shown in FIG. 4 differs from the carbon black reactor shown in FIGS. 1, 2 and 3 only in the downstream portion. Thus the cross-section taken along lines 3—3 through the reactor in FIG. 4 is identical to the cross-section shown in FIG. 3, taken along line 3—3 in FIG. 1. The carbon black reactor 1 shown in FIG. 4 is an A-type axial carbon black reactor. The vortex zone 3 and the reaction zone 4 in this reactor are one large cylindrical zone 34 confined by a wall 60 with no physical boundary to be defined between these two sections. At the downstream end, the large diameter zone 34 is confined by downstream confining wall 41. Also quench means 44 and 45 are provided for close to the downstream end of the reactor. Carbon black-containing smoke is withdrawn via conduit 43 from the downstream end of the carbon black reactor.

EXAMPLE

In a microreactor in which the dimensions were as given in the following, carbon black was produced by using benzene as the hydrocarbon feedstock. Air was tangentially introduced in quantities shown in the following and oxygen and/or methane was introduced into the axial zone.

| The reactor dimensions were: | |
|---|---|
| Axial length A of the axial zone: | 2 inches |
| Length of the side of the equilateral triangle in axial zone: | ¾ inch |
| Diameter of the water-cooled feed tube: | ½ inch |
| Axial length V of the vortex zone: | 2¼ inches |
| Diameter dv of the vortex zone: | 4 inches |
| Axial length R of the reaction section: (Distance between the location of the quench and the upstream entry of the reaction zone). | 21¾ inches |
| Length of the side of the equilateral triangle cross-section of the reaction zone: | ¾ inch |

Five fuel gas inlet tubes 25 were used. These fuel gas inlets had ¼-inch diameter and were arranged on a 3-inch-diameter circle symmetrically around the reactor axis.

The quantities of reactants introduced, as well as the results and properties of the carbon black obtained, are shown in the following table:

TABLE

| Run Number | 1 | 2 | 3 | 4 |
|---|---|---|---|---|
| Axial Zone Used | No | Yes | Yes | Yes |
| Axial $O_2$, SCF/hr | 0 | 9.6 | 9.6 | 0 |
| Axial Gas ($CH_4$), SCF/hr | 0 | 30 | 0 | 15 |
| Feed Tube Location, inches | +1 | +1¾ | −¼ | −½ |
| (+ is into precombustion zone, − is into axial zone) | | | | |
| Tangential Air, SCF/hr | 376 | 353 | 293 | 337 |
| Primary (Ring) Gas ($CH_4$), SCF/hr | 27 | 30 | 51 | 15 |
| Feed Benzene, cc/min (as gas) | 26 | 23 | 16 | 24 |
| $N_2SA$ - CTAB, m²/gm | 22 | 18 | 20 | 6 |
| Product: | | | | |
| $N_2SA$, m²/gm | 143 | 135 | 126 | 119 |
| $I_2NO$, m²/gm | 125 | 123 | 116 | 108 |
| CTAB, m²/gm | 121 | 117 | 106 | 113 |
| Tint | 115 | 114 | 93 | 117 |
| 24M4 DBP, cc/100 gm | 102 | 103 | 119 | 113 |
| Tint Residual | +3 | +2 | −9 | +7 |
| High Tint, High Structure | — | — | — | Yes |

The nitrogen surface area $N_2SA$ has been measured in accordance with ASTM D 3037-71T, Method A.

The iodine surface area $I_2NO$ has been measured in accordance with ASTM D 1510-70.

The CTAB surface area CTAB has been measured in accordance with J. Janzen and G. Kraus, *Rubber Chem. and Tech.* 44, 1287 (1971).

The tint has been measured as disclosed in ASTM D 3265-73.

The structure 24M4 DBP has been measured in accordance with U.S. Pat. No. 3,548,454, as measure after crushing, by Method B, ASTM D 2414-70.

The tint residual is calculated from these values in accordance with the following formula:

$$\text{measure tint minus } [56.0 + 1.057 (CTAB) - 0.002745 (CTAB)^2 - 0.2596 (24M4) - 0.201 (N_2SA - CTAB)].$$

The results obtained show that the reactor of this invention is extraordinarily versatile; with an injection of methane into the axial zone, a very high tint carbon black was obtained. Furthermore, the results shown above indicate that by injecting oxygen into the axial zone rather than methane, the tint is lowered considerably. Thus a carbon black with a very broad particle size distribution is obtained by such a procedure.

Reasonable variations and modifications that will become apparent to those skilled in the art can be made in this invention without departing from the spirit and scope thereof.

I claim:

1. A process for producing carbon black having a tint of about 113 or higher and a structure of about 117 or higher comprising:
   (A) introducing a normally liquid hydrocarbon feedstock into a carbon black reactor essentially in axial direction along the reactor axis, said carbon black reactor comprising:
      a. an upstream confining wall,
      b. a downstream confining wall,
      c. a tubular confining wall between said upstream and said downstream confining wall, which tubular confining wall comprises
         aa. connected to said upstream confining wall a longitudinal tubular axial section, at least the downstream portion thereof having essentially triangular cross-section and confining an axial zone,
         bb. in open communication and axial alignment with and operatively connected to said axial section a vortex section having an essentially plane upstream wall and connected to said essentially plane upstream wall a cylindrical wall confining a vortex zone, said cylindrical wall having an internal diameter that is larger than the diameter of a circle inscribed into the triangle cross-section of said axial zone, said axial zone opening through said essentially plane upstream wall into said vortex zone,
         cc. in open communication and axial alignment with and operatively connected to said vortex section a reaction section confining a reaction zone,
      d. first conduit means for the introduction of hydrocarbon feedstock along the reactor axis into the axial zone,
      e. vortex generating means for generating a vortex of hot combustion gases in said vortex zone, and
      f. second conduit means for the withdrawal of carbon black-containing smoke from the reactor,
   (B) generating a vortex of hot combustion gases in said vortex zone close to said cylindrical wall and close to said plane upstream wall,
   (C) introducing a stream of essentially oxygen-free gas into said axial zone,
   (D) contacting said hydrocarbon feedstock with said hot combustion gases in said reactor to produce a reaction admixture and to pyrolytically decompose said hydrocarbon feed to form carbon black,
   (E) passing said reaction admixture through said reaction zone to said downstream confining wall, and
   (F) withdrawing a carbon black-containing smoke via said second conduit means from said carbon black reactor.

2. A process in accordance with claim 1 wherein the hydrocarbon feed is discharged into the axial zone at a location which is about 0.1 to about 4 diameters of the circle inscribed into the triangle cross-section of this axial zone upstream of the downstream end of the axial zone.

3. A process in accordance with claim 1 comprising introducing an oxidant gas tangentially into the vortex zone close to the cylindrical wall and close to the plane upstream wall,
   introducing a gaseous fuel essentially in axial direction into the vortex zone from three or more fuel outlet nozzles arranged symmetrically and equidistant around the reactor axis in the plane upstream wall of the combustion section, and
   combusting the gaseous fuel introduced and the oxidant to form a vortex of hot combustion gases in the vortex zone.

4. A process in accordance with claim 1 wherein fuel is introduced into the axial zone.

5. A process in accordance with claim 3 wherein the hydrocarbon feed is an aromatic oil having a BMCI of 80 to 160 and a 50% boiling point of about 200° to about 600° F, wherein the gaseous fuel is selected from the group consisting of methane, natural gas and propane, and the oxidant is air.

* * * * *